United States Patent
Nilles et al.

(10) Patent No.: US 12,158,973 B1
(45) Date of Patent: Dec. 3, 2024

(54) TECHNIQUES RELATED TO STABLE PSEUDONYMOUS IDENTIFIERS

(71) Applicant: Amazon Technologies, Inc., Seattle, WA (US)

(72) Inventors: John Nilles, Poulsbo, WA (US); Lionel Bitoun, Palo Alto, CA (US); Rahul Chopra, Bellevue, WA (US); Fredrik Wass, Boulder, CO (US); Ron E. Knapp, Warrenton, VA (US); Megan Duffy, Erie, CO (US); Nelson M. Pereira, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 17/699,548

(22) Filed: Mar. 21, 2022

(51) Int. Cl.
| | |
|---|---|
| G06F 21/78 | (2013.01) |
| G06F 21/60 | (2013.01) |
| G06F 21/62 | (2013.01) |
| H04L 9/06 | (2006.01) |
| H04L 9/08 | (2006.01) |

(52) U.S. Cl.
CPC ........ G06F 21/6254 (2013.01); G06F 21/602 (2013.01); H04L 9/0891 (2013.01); G06F 2221/2107 (2013.01)

(58) Field of Classification Search
None
See application file for complete search history.

(56) References Cited

U.S. PATENT DOCUMENTS

| | | | | |
|---|---|---|---|---|
| 7,415,617 | B2* | 8/2008 | Ginter | H04N 21/2362 375/E7.009 |
| 9,881,164 | B1* | 1/2018 | McKay | G06F 21/602 |
| 11,558,192 | B2* | 1/2023 | Auh | H04L 9/0861 |
| 2011/0296193 | A1* | 12/2011 | Alghathbar | H04L 9/0643 713/181 |
| 2014/0215120 | A1* | 7/2014 | Saylor | H04L 9/0662 711/104 |
| 2018/0239920 | A1* | 8/2018 | Gupta | G06F 21/6218 |
| 2020/0259800 | A1* | 8/2020 | Masny | H04L 63/0428 |
| 2021/0133340 | A1* | 5/2021 | Solotorevsky | G06F 21/44 |
| 2021/0167959 | A1* | 6/2021 | Bayon | G06F 16/284 |

* cited by examiner

Primary Examiner — Christopher B Robinson
(74) Attorney, Agent, or Firm — Eversheds Sutherland (US) LLP

(57) ABSTRACT

Systems, devices, and methods are provided for stable pseudonymous identifiers. A system may obtain first data, and obtain a first cryptographic key from a cryptography service. The system may determine, based at least in part on the first data and the first cryptographic key, a first hash output of a hash function. The system may determine that a mapping table does not include a first record associated with the first hash output. The system may create, in the mapping table, a first record comprising the first hash output and a random value. The system may provide the random value as a stable pseudonymous identifier of the first data. If the first cryptographic key is subject to a key rotation, the pseudonymous identifier of the first data may remain constant even though the value of the key changes as a result of the key rotation.

20 Claims, 10 Drawing Sheets

TECHNIQUES RELATED TO STABLE PSEUDONYMOUS IDENTIFIERS

BACKGROUND

A common approach to pseudonymization of sensitive data is to use a one-way hash function to de-identify the sensitive data. A one-way hash function may receive, as inputs, the sensitive data and a secret. A problem with this approach is that information security best practice is to rotate the secret, used in the hash function, on a regular basis. Once rotated the hash function will return a different value for the same sensitive data as it did prior to secret rotation. This results in a non-stable pseudonymous identifier for the sensitive data and reduces the effectiveness of the systems working with pseudonymous data as there is no way to determine whether there is a linkage between a first pseudonymous identifiers generated prior to a key rotation and a second pseudonymous identifier generated after the key rotation.

Figure 1:
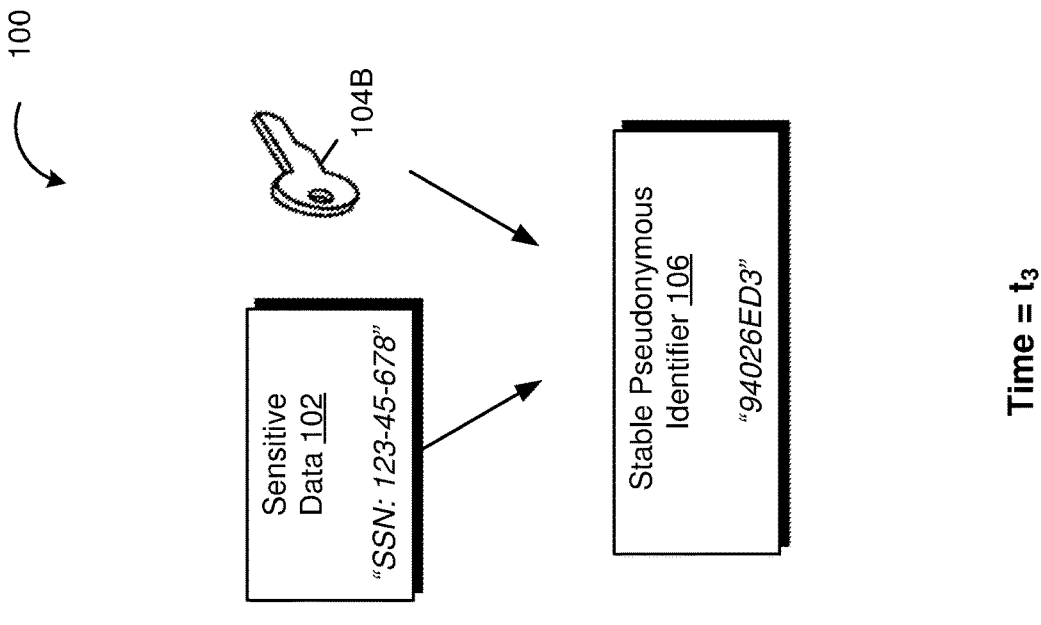
FIG. 1 illustrates a system in which stable pseudonyms may be generated and/or utilized, in accordance with one or more example embodiments of the present disclosure.
Figure 1:
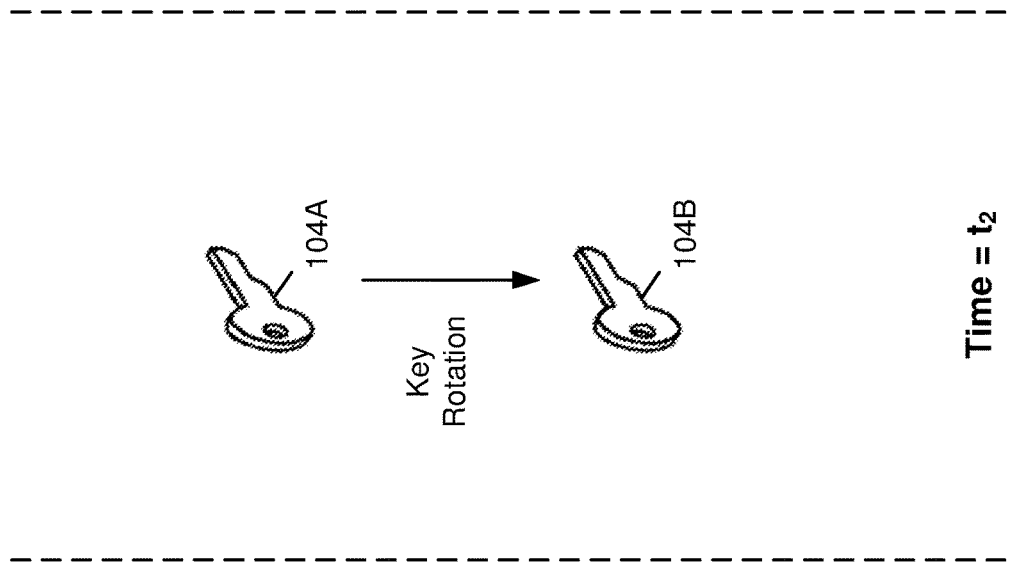
Figure 1:
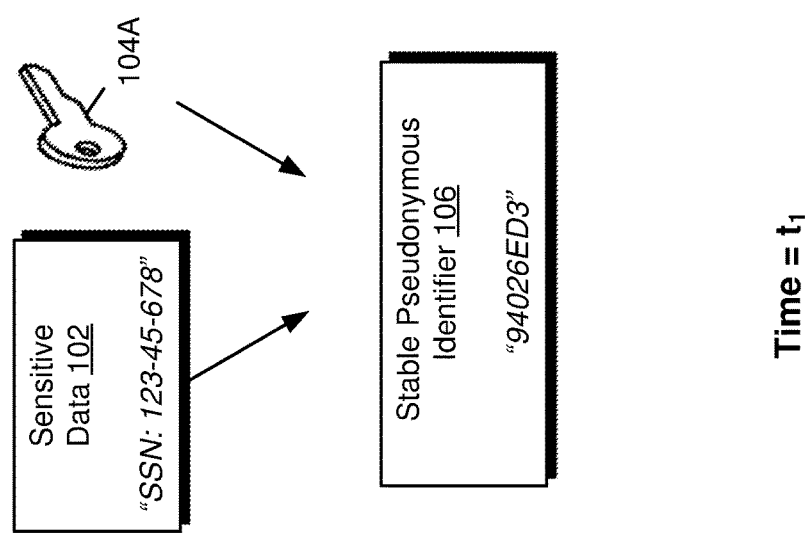

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for techniques related to stable pseudonymous identifiers. A stable pseudonymous identifier may remain constant even with a key rotation occurs that changes the underlying value of cryptographic material that is used in the process used to determine stable pseudonymous identifiers. For example, a cryptographic key may be used to pseudonymize sensitive data in various implementation—even if the key is subject to a key rotation, the value of a stable pseudonymous identifier remains constant.

In various embodiments, a system receives or otherwise ingests sensitive data. A system may be used to pseudonymize various types of data, including but not limited to: Personally Identifiable Information (PII); Personal Information (PI); Sensitive Personal Information (SPI); Nonpublic Personal Information (NPI); Material Nonpublic Information (MNPI); Private Information; Protected Health Information (PHI); regulated, business, or confidential data; or others. Furthermore, certain types of data may be subject to government regulations or rules, such as the European Union's General Data Protection Regulation (GDPR). There may be a need to be pseudonymize sensitive data to de-identify the data from a specific user for a variety of reasons.

In various embodiments, when sensitive data crosses the data boundary, it is hashed (e.g., an example of a pseudonymization technique). This may be done both as a privacy protection measure for a customer, as well as to allow the system to discard the plaintext data as soon as possible. This may be done to limit the blast radius of any data leaks, as there is little value in pseudonymized data being exposed in a data leak or electronic attack.

Continuing, when sensitive data is received and passes across the data boundary, a determination may be made as to how to pseudonymize the data. In various embodiments, an object type of the sensitive data is determined. The object type may refer to the type of data encoded in sensitive data. For example, different types of data objects include user identifiers, order identifiers, social security numbers (SSNs), and so forth. Each object type may be associated, either explicitly or implicitly, with a pseudonymization technique. Different pseudonymization techniques may include techniques to create unstable identifiers, semi-stable identifiers, and/or stable identifiers. In some cases, data does not need to be pseudonymized at all, and may be passed to downstream systems (e.g., advertising systems) in plaintext without performing any pseudonymization techniques.

In various embodiments, an appropriate pseudonymization technique is chosen based on the sensitivity of the data and whether there is a need for stability of an identifier over time. For example, consider a customer identifier-information relating to a customer may be associated to the customer via the customer's customer identifier. However, providing downstream systems with the plaintext customer identifier may be inappropriate in certain circumstances, as it may allow the downstream systems to ascertain the customer's underlying identity. To this end, the customer identifier may be pseudonymized to provide the customer a level of privacy. The downstream system may associate other data, such as orders, to the pseudonymized customer identifier. Accordingly, it would be beneficial to have a stable pseudonymized identifier for customer identifier objects, as it would allow for the association/binding to a customer identity to remain constant over time, even if a key rotation occurs. In contrast, the result of using an unstable pseudonymous identifier would be that it would appear as if there were two different customers, and some information would be associated with a first unstable identifier and other information would be associated with a second unstable identifier, which would be undesirable. Techniques described herein allow for key rotations to occur—for example, to improve the security and privacy of data that is being pseudonymized from attacks—while also allowing for the same pseudonymized value to be associated to an object before and after the occurrence of the key rotation.

Pseudonymous identifiers may be determined based at least in part on a hash function. A hash functions as described herein may refer to a keyed-hash message authentication code or hash-based message authentication code) is a specific type of message authentication code (MAC) involving a cryptographic hash function and a secret cryptographic key. An HMAC (hash-based message authentication code) may be used to implement hash function 204, according to at least one embodiment.

In various embodiments, a cryptographic key is obtained from a key store. A key store may refer to a data store where cryptographic keys are securely stored. For example, cryptographic keys may be stored resident to a hardware security module (HSM) that is managed by a cryptography service. In various embodiments, a key store is managed by a cryptography service and a system obtains access to a key by submitting a request to the cryptography service for the key. In various embodiments, the key is associated with a system or user.

In at least one embodiment, a determination is made to generate a stable identifier for the sensitive data. Sensitive data may be provided as the hash input (or as a portion thereof) to a hash function and key may be provided as the hash secret of the hash function to produce a hash output. In various embodiments, the resulting hash output or portion thereof is provided to an identity mapping function.

Identity mapping function may refer to hardware, software, or a portion thereof that performs an identity mapping function that maps hash outputs (or quantities derived thereof) to stable identifiers. In at least one embodiment, identity mapping function determines a mapping table based on the object type of sensitive data. For example, if sensitive data encodes or otherwise includes a user identifier, a user mapping table is selected, if sensitive data encodes or otherwise includes an order number, an order mapping table is selected, and so on and so forth. Other mapping tables may exist for other object types. A mapping table may be implemented as a key-value store, in at least some embodiments.

A hash output generated by hash function may be provided to identity mapping function. Identity mapping function may select an appropriate mapping table (e.g., based on the object type extracted from sensitive data) and query the selected mapping table using the hash output as the key to the table.

If no entry is found in the mapping table, then a new entry may be created with the hash output as the key of a key-value pair. Identity mapping function may create a new mapping by generating a random value. For example, identity mapping function may generate universally unique identifier (UUID) or globally unique identifier (GUID) as the random value. In some embodiments, the random value is generated as a hash of the hash output. Regardless, a random value may be determined and assigned as the value of a key-value pair. Accordingly, a key-value pair may be added to the appropriate mapping table wherein the key is the hash output and the value is the random value. This random value may be referred to as a stable pseudonymous identifier.

Conversely, if there already exists an entry in the mapping table that corresponds to the hash output generated by hash function, the entry may be retrieved and the value of the key-value pair may be extracted and provided to downstream systems as the stable pseudonymous identifier.

In various embodiments, the sensitive data is only ever stored as plaintext in volatile memory (e.g., DRAM) of the system and the plaintext is discarded once the hash output is generated. This means that, in at least some embodiments, downstream components are unable to ascertain the underlying contents of sensitive data after it has been hashed. A technical benefit of this design is that such embodiments reduce the amount of time that plaintext sensitive data is managed by system, thereby reducing privacy risks. Furthermore, this design can be used to ensure that the sensitive data is not persisted in plaintext using any non-volatile storage at any point, meaning that there is only a transitory period of time in which sensitive data exists in plaintext within system, thereby reducing the risk to both the data owners as well as the system.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a system 100 in which stable pseudonyms may be generated and/or utilized, in accordance with one or more example embodiments of the present disclosure.

In various contexts and use cases, computer systems such as service providers may ingest sensitive data, such as sensitive data 102. There are many types of sensitive data, which includes but is not limited to: Personally Identifiable Information (PII); Personal Information (PI); Sensitive Personal Information (SPI); Nonpublic Personal Information (NPI); Material Nonpublic Information (MNPI); Private Information; Protected Health Information (PHI); regulated, business, or confidential data; or others. Furthermore, certain types of data may be subject to government regulations or rules, such as the European Union's General Data Protection Regulation (GDPR). There may be a need to be pseudonymize sensitive data to de-identify the data from a specific user for a variety of reasons.

As described herein, techniques to create stable pseudonyms may be implemented. According to at least one embodiment, pseudonyms are generated using a keyed hash function or keyed one-way function. In at least one embodiment, a stable pseudonym is generated using input data and a hash secret. The input data may be any suitable data, such as sensitive data 102 depicted in FIG. 1 as the social security number of a user, which is depicted as "SSN: 123-45-678" in FIG. 1. The hash secret may be cryptographic material, such as a cryptographic key associated with the user. In various embodiments, cryptographic key 104A is associated with a user. Using techniques described herein, stable pseudonymous identifier 106 may be generated from sensitive data 102 and first cryptographic key 104A at time $t_1$, as depicted in FIG. 1.

In various embodiments, best practices in computer security may involve the performance of key rotations. Key rotation may involve replacing keys with other keys to prevent collection of enough decrypted data to allow practical cracking of a cipher used. Key rotations may be performed based on various criteria. For example, cryptographic keys may be rotated on a periodic basis, after a cryptographic key has been used for encryption a threshold number of times, and so forth. In some embodiments, a key rotation may occur when there is reason to believe that the confidentiality of the cryptographic key is compromised. For example, if the cryptographic key is involved in a leak or protected by a cryptographic algorithm that is later determined to be insecure, a key rotation may be performed in response to such events. In various embodiments, FIG. 1 depicts a key rotation that occurs at time $t_2$ where $t_2 > t_1$. As part of a key rotation, first cryptographic key 104A may be replaced by second cryptographic key 104B such that pseudonymization operations performed subsequent to the key rotation are performed using second cryptographic key 104B instead of first cryptographic key 104A.

As depicted in FIG. 1, techniques described herein may be used to generate stable pseudonyms. At time $t_3$ where $t_3 > t_2$, the same sensitive data 102 may be pseudonymized. As noted earlier, a key rotation may have occurred, meaning that second cryptographic key 104B is used to pseudonymize sensitive data 102 rather than first cryptographic key 104A at time $t_1$, as seen in the left-hand portion of FIG. 1. Nevertheless, by using techniques described herein, the same stable pseudonymous identifier 106 may be generated using second cryptographic key 104B.

Techniques for generating stable pseudonyms may be described in greater detail below. Techniques described in connection with FIGS. 2-10 may be implemented in the context of FIG. 1.

When a system receive sensitive data, the sensitive data may be pseudonymized. In some cases, unstable pseudonyms may be acceptable. An unstable pseudonym may be generated as the output of a keyed hash function that accept sensitive data and a cryptographic key as inputs. In this case, the output of the keyed hash function for a piece of data may change over time if the cryptographic is rotated, for example. In other cases, stable or semi-stable pseudonyms may be generated. The manner in which sensitive data is pseudonymized may be determined based on various considerations, such as the user's geolocation (e.g., whether certain privacy regulations apply), the type of sensitive data, and so forth.

In at least one embodiment, a stable pseudonym is generated. A system may receive sensitive data. The sensitive data may be associated with a user. A cryptography service may be queried to obtain a cryptographic key associated with the user that may be used to pseudonymize the sensitive data. The sensitive data and the cryptographic key may be provided as inputs to a keyed hash function to produce a hash output.

An identity mapping function may be used to determine whether the hash output maps to an existing stable pseudonymous identifier. If no mapping is found, a random value may be generated as the stable pseudonymous identifier that corresponds to the hash output. The random value may, for example, be a universally unique identifier (UUID) or globally unique identifier (GUID). For the purposes of this disclosure, pseudorandom numbers may also be considered sufficiently random for use in at least some embodiments. The generated value may be used as the stable pseudonymous identifier and a mapping between the hash output and the stable pseudonymous identifier may be added to a table or data store. For example, a key-value store may be used to store the mapping between hash outputs and stable pseudonymous identifiers. If a mapping is found, the stable pseudonymous identifier may be retrieved from the mapping. In either case, a stable pseudonymous identifier is obtained or otherwise determined for the hash output and then provided as the stable pseudonymous identifier for the sensitive data.

In various embodiments, the stable pseudonymous identifier described herein is characterized as being stable because it remains constant even when a key rotation occurs that changes the cryptographic key that is associated with a user and that is used to generate the hash outputs used to query the identity mappings. For example, if the cryptographic key for a user is rotated for any reason, the identity mapping may be updated to ensure that the same stable pseudonymous identifier is generated for a piece of data. These techniques are described in greater detail in connection with FIGS. 2-4.

Figure 2:
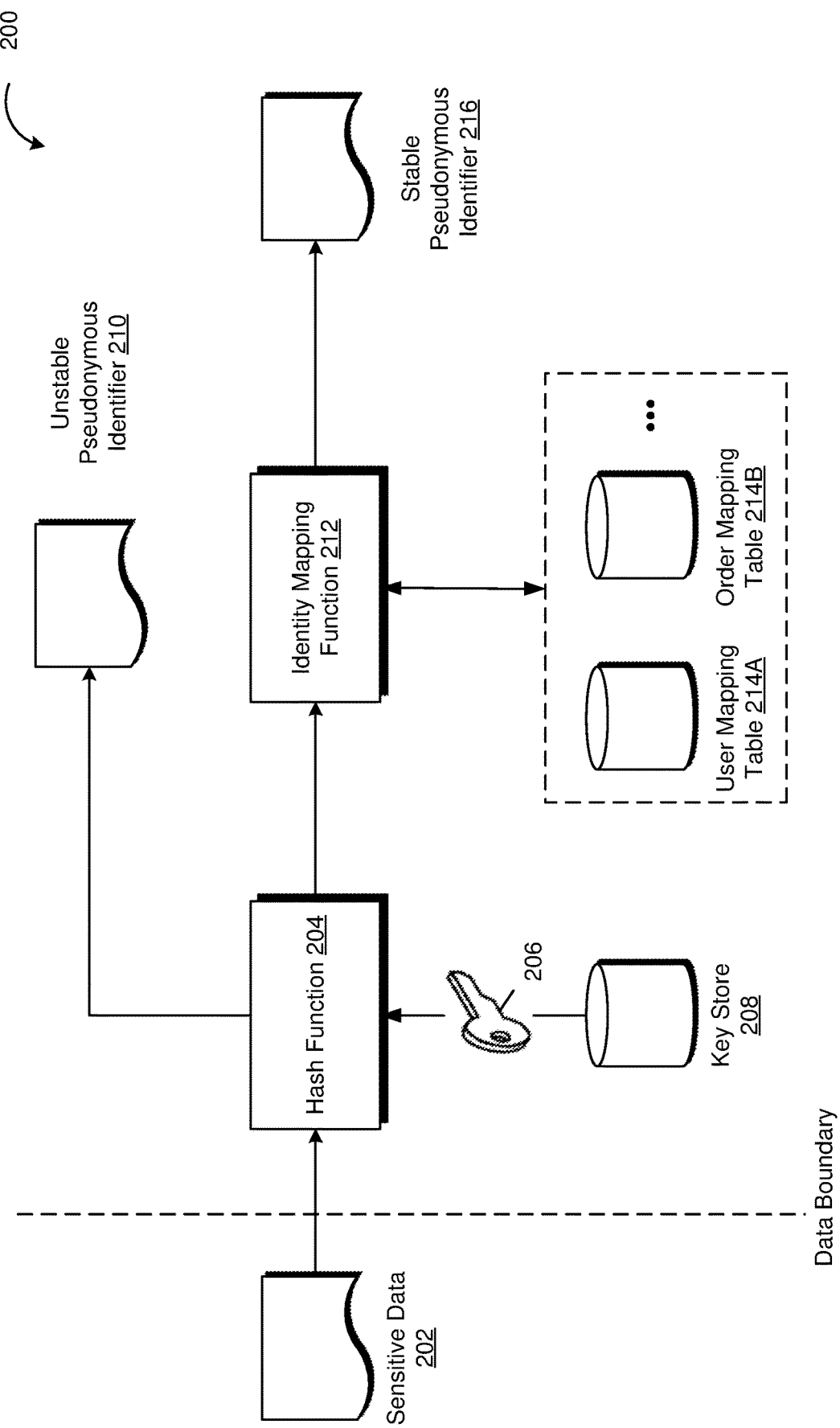
FIG. 2 illustrates a system for pseudonymizing data, in accordance with one or more example embodiments of the present disclosure.

FIG. 2 illustrates a system 200 for pseudonymizing data, in accordance with one or more example embodiments of the present disclosure.

In various embodiments, the system receives or otherwise ingests sensitive data 202. Sensitive data 202 depicted in FIG. 2 is an illustrative example of data to be pseudonymized by system 200. System 200 may be used to pseudonymize various types of data, including but not limited to: Personally Identifiable Information (PII); Personal Information (PI); Sensitive Personal Information (SPI); Nonpublic Personal Information (NPI); Material Nonpublic Information (MNPI); Private Information; Protected Health Information (PHI); regulated, business, or confidential data; or others. Furthermore, certain types of data may be subject to government regulations or rules, such as the European Union's General Data Protection Regulation (GDPR). There may be a need to be pseudonymize sensitive data to de-identify the data from a specific user for a variety of reasons.

Sensitive data 202 may be received over a data boundary. For example, within advertising systems, the a user's specific identity, order identifiers, and so forth may be pseudonymized so that the advertiser is unable to deduce the exact order number, but is able to use the pseudonymized data for various purposes that do not involve the user's specific identifier, specific product identifiers, and so forth, thereby providing a greater level of privacy to the user as compared to systems that do not pseudonymize data.

In various embodiments, when sensitive data 202 crosses the data boundary, it is first pseudonymized. This may be done both as a privacy protection measure for a customer, as well as to allow the system to discard the plaintext data as soon as possible. This may be done to limit the blast radius of any data leaks, as there is little value in pseudonymized data being exposed in a data leak or electronic attack.

Continuing with FIG. 2, when sensitive data 202 is received and passes across the data boundary, a determination may be made as to how to pseudonymize the data. In various embodiments, an object type of the sensitive data 202 is determined. The object type may refer to the type of data encoded in sensitive data 202. For example, different types of data objects include user identifiers, order identifiers, social security number (SSN)s, and so forth. Each object type may be associated, either explicitly or implicitly, with a pseudonymization technique. Different pseudonymization techniques may include techniques to create unstable identifiers, semi-stable identifiers, and/or stable identifiers. Semi-stable identifiers are described in greater detail below, for example, in connection with FIG. 6, and may be implemented in the context of FIG. 2. In some cases, data does not need to be pseudonymized at all, and may be passed to downstream systems (e.g., advertising systems) in plaintext without performing any pseudonymization techniques.

In various embodiments, an appropriate pseudonymization technique is chosen based on the sensitivity of the data and whether there is a need for stability of an identifier over time. For example, consider a user identifier-information relating to a user may be associated to the user via the user's user identifier. However, providing downstream systems with the plaintext user identifier may be inappropriate in certain circumstances, as it may allow the downstream systems to ascertain the user's underlying identity. To this end, the user identifier may be pseudonymized to provide the user with a level of privacy. The downstream system may associate other data, such as orders, to the pseudonymized user identifier. Accordingly, it would be beneficial to have a stable pseudonymized identifier for user identifier objects, as it would allow for the association/binding to a user identity to remain constant over time, even if a key rotation occurs. In contrast, the result of using an unstable pseudonymous identifier would be that it would appear as if there were two different users, and some information would be associated with a first unstable identifier and other information would be associated with a second unstable identifier, which would be undesirable. Techniques described herein allow for key rotations to occur—for example, to improve the security and privacy of data that is being pseudonymized from attacks—while also allowing for the same pseudonymized value to be associated to an object before and after the occurrence of the key rotation.

As depicted in FIG. 2, a hash function 204 may be used to either directly or indirectly generate pseudonymous identifiers. Pseudonymous identifiers may be determined based at least in part on hash function 204. Hash function 204 may refer to a keyed-hash message authentication code or hash-based message authentication code) is a specific type of message authentication code (MAC) involving a cryptographic hash function and a secret cryptographic key. An HMAC (hash-based message authentication code) may be used to implement hash function 204, according to at least one embodiment.

In various embodiments, key 206 is obtained from key store 208. Key store 208 may refer to a data store where cryptographic keys are securely stored. For example, cryptographic keys may be stored resident to a hardware security module (HSM) that is managed by a cryptography service. In various embodiments, key store 208 is managed by a cryptography service and a system obtains access to key 206 by submitting a request to the cryptography service for the key 206. In various embodiments, key 206 is associated with a user, such as the user that is performing the pseudonymization of the data. In some embodiments, the key is associated with the contents of the data being pseudonymized.

In at least one embodiment, a determination is made as to whether and/or how sensitive data 202 should be pseudonymized. For example, if the determination is made that an unstable identifier is suitable for sensitive data 202, the unstable pseudonymous identifier 210 may be generated. In at least one embodiment, unstable pseudonymous identifier 210 is generated as the hash output of hash function 204, which receives sensitive data 202 as the hash input (or portion thereof) and key 206 as the hash secret. In some embodiments, unstable pseudonymous identifier 210 is a portion of the hash output or otherwise derived from the hash output. A characteristic of unstable pseudonymous identifier 210 is that the unstable identifier associated with a piece of data (e.g., sensitive data 202) may change over time. For example, if a cryptography service performs a key rotation and changes the value of key 206, then the unstable identifier for sensitive data 202 would change.

In at least one embodiment, a determination is made to generate a stable identifier for sensitive data 202. Sensitive data 202 may be provided as the hash input (or as a portion thereof) to hash function 204 and key 206 may be provided as the hash secret of hash function 204 to produce a hash output. In various embodiments, the resulting hash output or portion thereof is provided to identity mapping function 212.

In various embodiments, the plaintext data is only ever stored in volatile memory (e.g., DRAM) of system 200 and the plaintext data is discarded once a hash output is generated by hash function 204. This means that, in at least some embodiments, downstream components are unable to ascertain the underlying contents of sensitive data 202 after it has been hashed. A technical benefit of this design is that such embodiments reduce the amount of time that plaintext sensitive data is managed by system 200, thereby reducing privacy risks. Furthermore, this design can be used to ensure that the sensitive data is not persisted in plaintext using any non-volatile storage at any point, meaning that there is only a transitory period of time in which sensitive data exists in plaintext within system 200, thereby reducing the risk to both the data owners as well as the system 200.

Identity mapping function 212 may refer to hardware, software, or a portion thereof that performs an identity mapping function that maps hash outputs (or quantities derived thereof) to stable identifiers. In at least one embodiment, identity mapping function determines a mapping table based on the object type of sensitive data 202. For example, if sensitive data 202 encodes or otherwise includes a user identifier, a user mapping table 214A is selected, if sensitive data 202 encodes or otherwise includes an order number, an order mapping table 214B is selected, and so on and so forth. Other mapping tables may exist for other object types. A mapping table may be implemented as a key-value store, in at least some embodiments.

A hash output generated by hash function 204 may be provided to identity mapping function 212. Identity mapping function 212 may select an appropriate mapping table (e.g., based on the object type extracted from sensitive data 202) and query the selected mapping table using the hash output as the key to the table.

If no entry is found in the mapping table, then a new entry may be created with the hash output as the key of a key-value pair. Identity mapping function 212 may create a new mapping by generating a random value. For example, identity mapping function 212 may generate universally unique identifier (UUID) or globally unique identifier (GUID) as the random value. In some embodiments, the random value is generated as a hash of the hash output. Regardless, a random value may be determined and assigned as the value of a key-value pair. Accordingly, a key-value pair may be added to the appropriate mapping table wherein the key is the hash output and the value is the random value. This random value may be referred to as a stable pseudonymous identifier 216.

Conversely, if there already exists an entry in the mapping table that corresponds to the hash output generated by hash function 204, the entry may be retrieved and the value of the key-value pair may be extracted and provided to downstream systems as the stable pseudonymous identifier 216.

Figure 3:
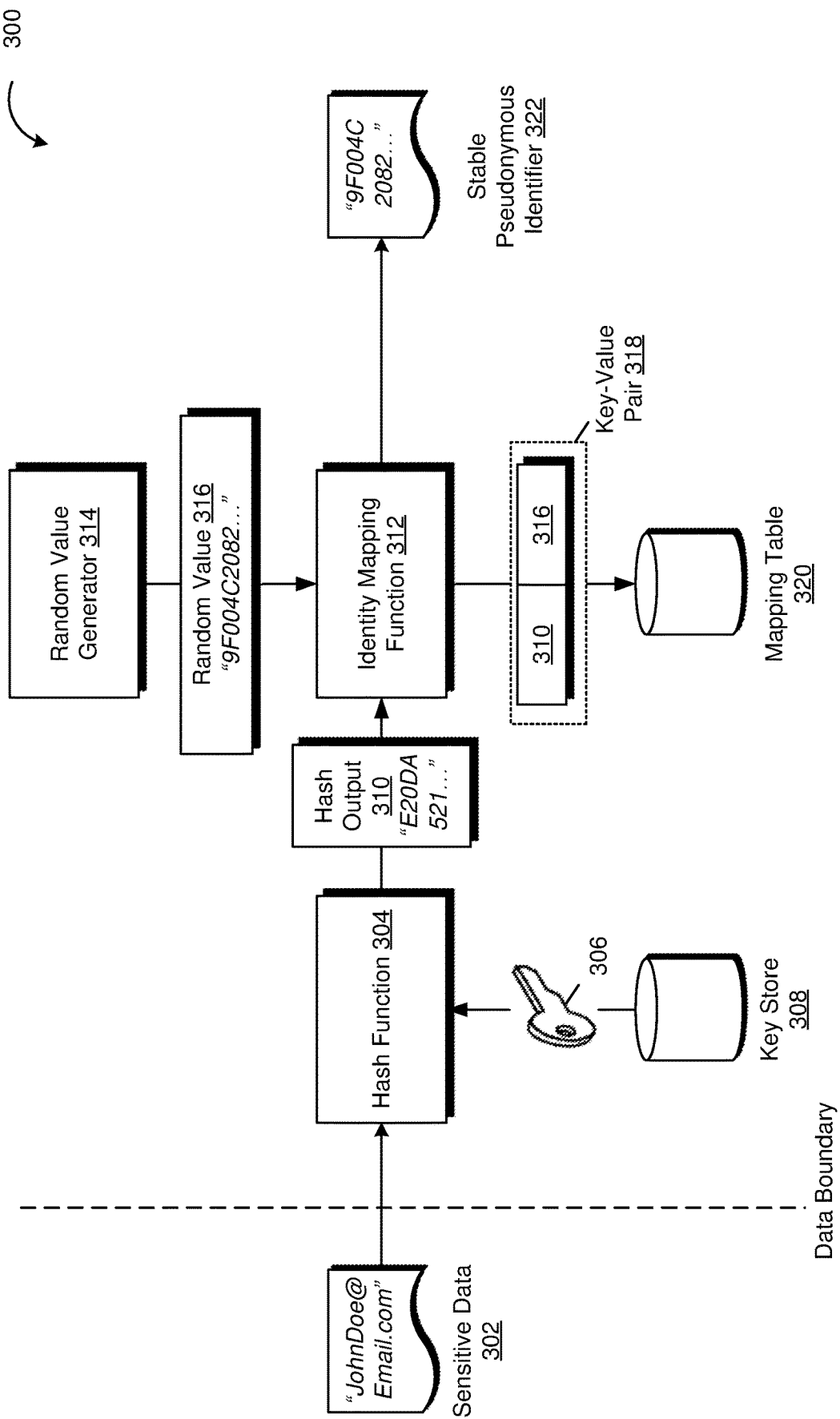
FIG. 3 illustrates a system related to stable pseudonymized identifiers, in accordance with one or more example embodiments of the present disclosure.

FIG. 3 illustrates a system 300 related to stable pseudonymized identifiers, in accordance with one or more example embodiments of the present disclosure. System 300 may be implemented in the context of FIG. 2, as well as other embodiments described in this disclosure.

Sensitive data 302 may refer to data that is to be pseudonymized, such as PII or PHI. FIG. 3 illustrates example sensitive data 302 as a customer's email address "JohnDoe@Email.com." The sensitive data 302 may be provided across a data boundary, where it is pseudonymized using a hash function 304, such as a HMAC function. In various embodiments, a key 306 is obtained from a key store 308, for example, as described in connection with FIG. 2. The hash function may generate hash output 310 based on the sensitive data 302 and the key 306. Here, the hash output may be a quantity that is one-way or effectively one-way such that it is impossible or impracticable to determine the hash input "JohnDoe@Email.com" from the hash output "E20DA521 . . . " without access to the key 306.

To create a stable pseudonymous identifier, the hash output 310 may be provided to an identity mapping function 312. Identity mapping function 312 may obtain, from a random value generator 314, a random value 316. For example, random value generator 314 may be used to generate universally unique identifiers (UUIDs). Random value 316 is depicted as a random sequence of digits "9F004C2082 . . . " with no intrinsic meaning.

A key-value pair 318 may be generated with the hash output 310 as the key to the key-value pair and the random value 316 as the value of the key-value pair. The key-value pair 318 may be persisted in a data store, such as mapping table 320. Mapping table 320 may be implemented as a key-value store, database system, or using other suitable data storage systems. The random value 316 or a quantity derived thereof may be provided to downstream systems as the stable pseudonymous identifier 322.

Figure 4:
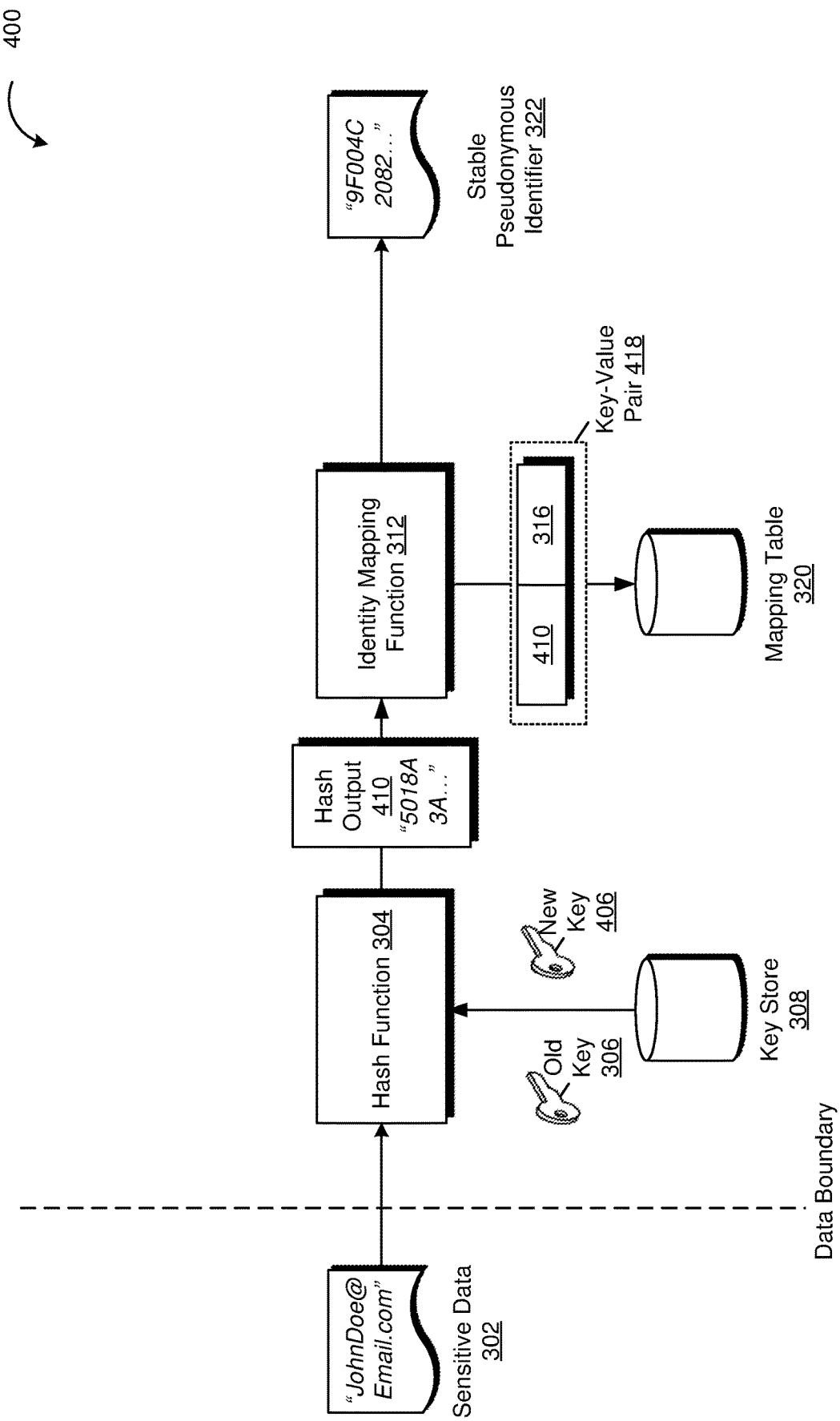
FIG. 4 illustrates a system related to stable pseudonymized identifiers, in accordance with one or more example embodiments of the present disclosure.

FIG. 4 illustrates a system 400 related to stable pseudonymized identifiers, in accordance with one or more example embodiments of the present disclosure. System 400 may be implemented in the context of FIG. 3, as well as other embodiments described in this disclosure.

In various embodiments, a stable pseudonymous identifier 322 is generated to protect the underlying contents of sensitive data 302. Furthermore, in various embodiments, a key 306 is used as part of the workflow to associate the sensitive data 302 to the stable pseudonymous identifier 322 (e.g., as discussed in connection with FIG. 3).

In various embodiments, and in the context of FIG. 4, key 306 may be referred to as an old key because it has been replaced by new key 406 via key rotation. In various embodiments, key rotation is a technique that replaces one cryptographic key with another. Old key 306 and new key 406 depicted in FIG. 4 are both associated with the same key identifier, according to at least one embodiment. Key 406 may be designated as a new or current key which can be used to generate cryptographic material.

In various embodiments, sensitive data 302 and new key 406 are used to generate hash output 410 using hash function 304. It should be noted that the value of hash output 410 "5018A3A . . . " is different from the value of hash output 310 "E20DA521 . . . " depicted in FIG. 3 because different keys are used to generate hash output 30 and hash output 410.

In various embodiments, old key 306 is used to generate hash output 310 and retrieve key-value pair 318. Key-value pair 318 may be updated or replaced by key-value pair 418, wherein the key of key-value pair 418 is the hash output 410 and the value of the key-value pair 418 is the random value 316 from key-value pair 318. The value of key-value pair 418 may be provided to downstream entities as the stable pseudonymous identifier 322. It should be noted that stable pseudonymous identifier 322 has the same value "9F004C2082 . . . " in FIG. 3 and FIG. 4 even though a key rotation has occurred.

Figure 5:
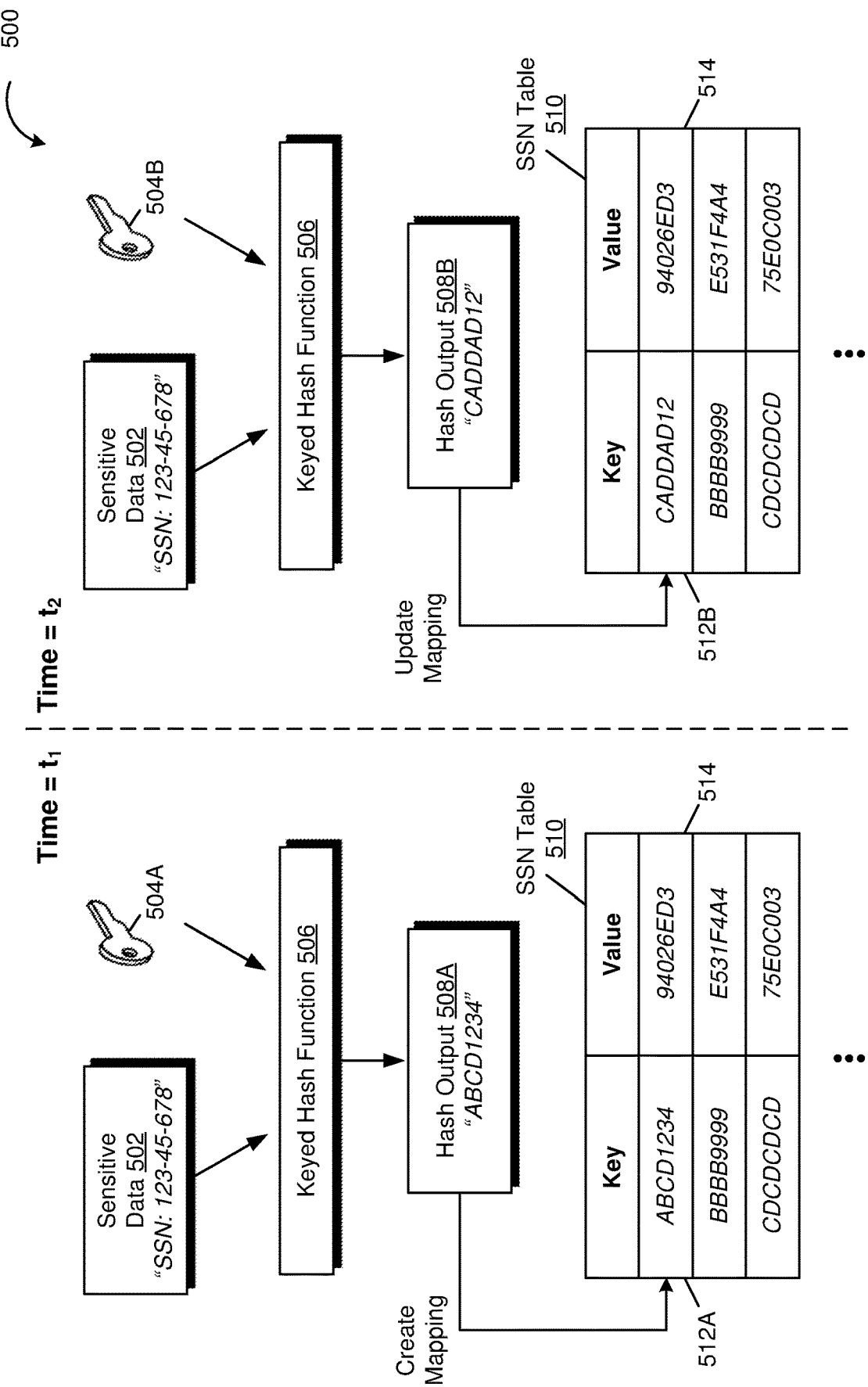
FIG. 5 illustrates a diagram in which the mapping for a stable pseudonymous identifiers is updated, in accordance with one or more example embodiments of the present disclosure.

FIG. 5 illustrates a diagram 500 in which the mapping for a stable pseudonymous identifiers is updated, in accordance with one or more example embodiments of the present disclosure.

Referring first to the left-hand portion of FIG. 5, a system, such as a machine described in connection with FIG. 10, may receive sensitive data 502. As depicted in FIG. 5, the sensitive data 502 may include the social security number associated with a user "123-45-678." The sensitive data may be pseudonymized for downstream consumers, such as advertising systems. First key 504A may be obtained. A user ID may be used to obtain first key 504A from a cryptography service. First key 504A may be associated with a user, such as the user that is pseudonymzing sensitive data 502, a user associated with the contents of sensitive data 502, and so forth. In some embodiments, first key 504A is associated with the type of object encoded in sensitive data 502. First key 504A may be an active key that can be used to perform cryptographic operations, such as encryption operations, keyed hash operations, and so forth. First key 504A may be a key that can be used to create cryptographic material.

Still referring to the left-hand portion of FIG. 5, sensitive data 502 and first key 504A may be provided as inputs to a keyed hash function 506. The sensitive data 502 may be an input string to the keyed hash function and the first key 504A may be a hash secret or key that is used by the keyed hash function 506. Keyed hash function may be a keyed-hash message authentication code that is implemented using a cryptographic hash function, such as SHA-2 or SHA-3.

Still referring to the left-hand portion of FIG. 5, keyed hash function 506 may generate, based on sensitive data 502 and first key 504A, a first hash output 508A. For illustrative purposes, the first hash output 508A may have a value "ABCD1234" which may be viewed merely as a metasyntactic value representative of an arbitrary first hash output value. Next, a table may be queried. The table may be selected based on object type. For example, social security number may be an object type, and a corresponding SSN table 510 may be queried because sensitive data 502 is a SSN. As an illustrative example, the SSN table 510 is implemented as a key-value store. The SSN table 510 may be queried to determine whether there key "ABCD1234" has any values. In the case that there is no record for "ABCD1234" in SSN table 510, a random number (e.g., in hexadecimal) may be created and stored as the corresponding value for "ABCD1234." In this case, and purely by way of example, "ABCD1234" may be associated with "94026ED3" in a Key-Value relationship and a stable mapping may thereby be created. The value "94026ED3" may be the stable pseudonymous identifier 514 for the social security number "123-45-567" with the following properties: first, it should be computationally impracticable or impossible to ascertain the underlying social security number "123-45-567" from the stable pseudonymous identifier "94026ED3"; second, the stable pseudonymous identifier "94026ED3" should remain associated with the underlying social security number "123-45-567" even if the first key 504A is rotated or otherwise replaced from use.

Referring now to the right-hand portion of FIG. 5, which occurs at time $t_2$ where $t_2 > t_1$, a system, such as a machine described in connection with FIG. 10, may receive sensitive data 502. As depicted in FIG. 5, the sensitive data 502 may include the social security number associated with a user "123-45-678." The sensitive data may be pseudonymized for downstream consumers, such as advertising systems. In various embodiments, a key rotation is performed that replaces first key 504A with second key 504B. Second key 504B may be obtained from a cryptography service. Second key 504B may be an active key that can be used to perform cryptographic operations, such as encryption operations, keyed hash operations, and so forth. Second key 504B may be a key that can be used to create cryptographic material. Furthermore, first key 504A may be obtained as a retired key or a previous version of the key. After a key rotation, first key 504A may still be accessible as a previous version of the user's key.

Still referring to the right-hand portion of FIG. 5, sensitive data 502 and second key 504B may be provided as inputs to a keyed hash function 506. The sensitive data 502 may be an input string to the keyed hash function and the second key 504B may be a hash secret or key that is used by the keyed hash function 506. Keyed hash function may be a keyed-hash message authentication code that is implemented using a cryptographic hash function, such as SHA-2 or SHA-3.

Still referring to the right-hand portion of FIG. 5, keyed hash function 506 may generate, based on sensitive data 502 and second key 504B, a second hash output 508B. For illustrative purposes, the second hash output 508B may have a value "CADDAD12" which may be viewed merely as a metasyntactic value representative of an arbitrary second hash output value. It should be noted that second hash output 508B and first hash output 508A have different values. Next, a table may be queried. The table may be selected based on object type. For example, social security number may be an object type, and a corresponding SSN table 510 may be queried because sensitive data 502 is a SSN. As an illustrative example, the SSN table 510 is implemented as a key-value store.

Still referring to the right-hand portion of FIG. 5, the SSN table 510 may be queried. The system may query a cryptography service for the current active key—second key 504B—as well as the previous version of the key, if one exists. In this case, the previous version of the key—second key 504A—may be provided to the system by the cryptography service.

Still referring to the right-hand portion of FIG. 5, the previous version of the key may be used to generate a hash output (not shown in right-hand portion of FIG. 5) using sensitive data 502, which would be "ABCD1234." SSN table 510 is queried to determine whether a key-value pair with "ABCD1234" as the key exists. In this case, it would exist (refer to discussion of left-hand portion of FIG. 1, describing how the mapping record is created). In this case, the mapping is updated wherein the key "ABCD123" is replaced by "CADDAD12." In some embodiments, the updating is performed by creating a new record in SSN table 510 that maps "CADDAD12" to "94026ED3" and then deleting the mapping of "ABCD1234" to "94026ED3." As a result, the same stable pseudonymous identifier 514 is associated with sensitive data 502 even after first key 504A is rotated and replaced by second key 504B.

Figure 6:
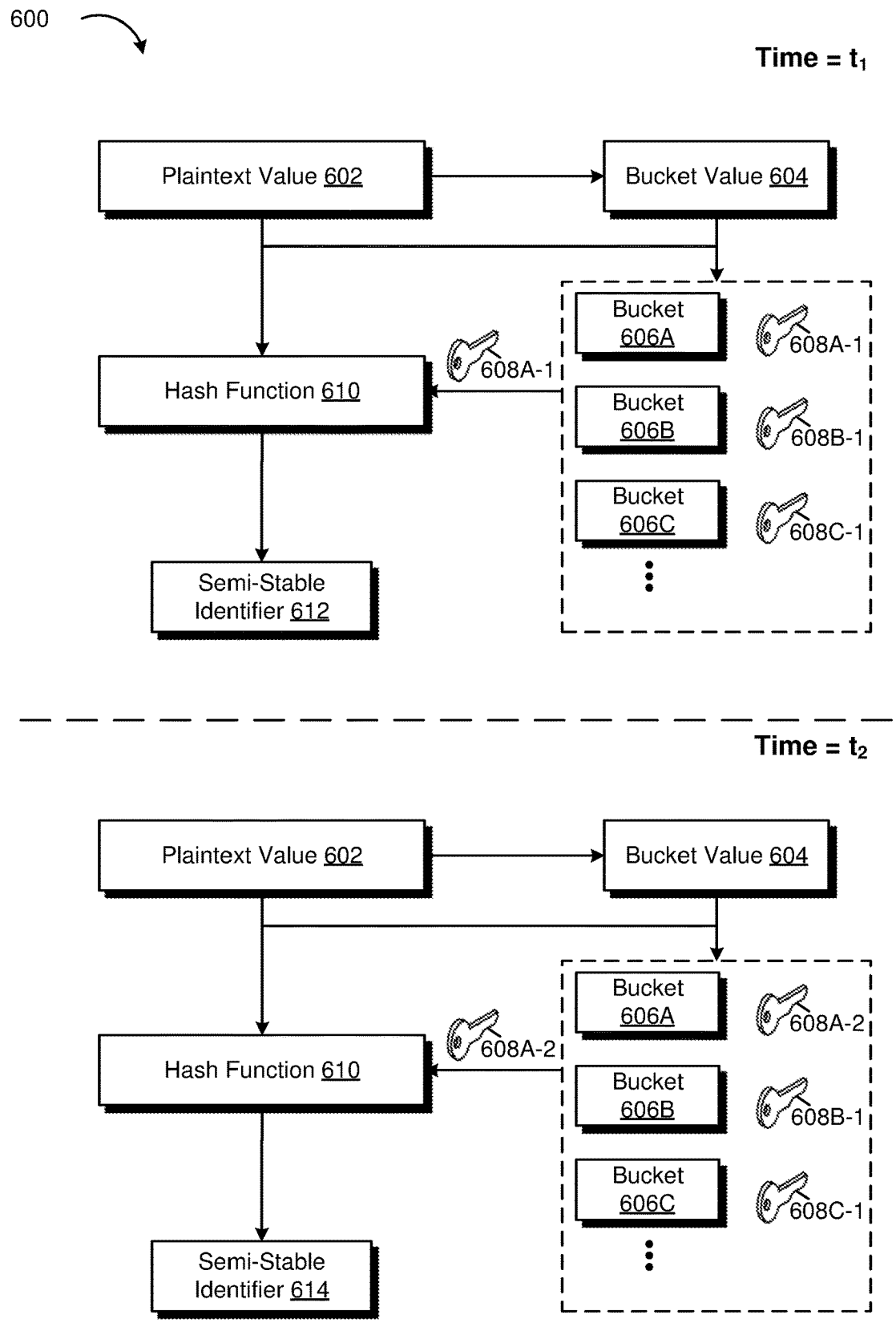
FIG. 6 illustrates a diagram in which semi-stable pseudonymous identifiers may be implemented, in accordance with one or more example embodiments of the present disclosure.

FIG. 6 illustrates a diagram 600 in which semi-stable pseudonymous identifiers may be implemented, in accordance with one or more example embodiments of the present disclosure.

The upper portion of FIG. 6 depicts an example of a semi-stable identifier generated at a first point in time, $t_1$. In various embodiments, a plaintext value 602 refers to any suitable input to a hash function. Plaintext value 602 may be a randomly generated value. For example, plaintext value 602 may include sensitive data that is to be pseudonymized. Bucket value 604 may refer to a value that may be used select a bucket from a plurality of buckets, such as buckets 606A, 606B, 606C, and so forth. Each bucket may be associated with a different hash key. At a first point in time, $t_1$, it is shown that bucket 606A is associated with key 608A-1, bucket 606B is associated with key 608B-1, bucket 606C is associated with key 608C-1, and so forth. The keys for each bucket may be guaranteed to be stable for a certain period of time, or may be based on other non-temporal conditions.

Plaintext value 602 and bucket value 604 may be combined in any suitable manner to form a plaintext identifier. For example, random value "A117BC99WXXZ" and bucket value "01" may be concatenated to form a plaintext identifier "A117BC99WXXZ01" that is provided as an input string to hash function 610. Hash function 610 may refer to a keyed hash function that receives an input string and a hash secret to produce an output, which is a semi-stable identifier.

Bucket value 604 may be determined in any suitable manner. For example, a bucket value 604 may be deterministically selected based on the date or other time information of when the plaintext identifier is generated. In one such example, as described in greater detail below, the bucket value is a value between 1 and 30 that is deterministically selected. For example, 30 buckets may be used for a 30 day period, but other periods, such as weekly or monthly periods may be used as well. Each bucket may be associated with a hash secret to be applied by the hash function for all identifiers that are linked to the bucket. For example, bucket B_1 may be associated with January 1, bucket B_2 may be associated with January 2, and so forth and so on. Continuing, the last bucket B_30 may be associated with January 30, and then assignments may be restarted at the first bucket so that January 31 is associated with bucket B_1. In various embodiments, plaintext value 602 encodes or otherwise is usable to determine the corresponding bucket value 604. For example, the bucket value 604 appended or prepended to a plaintext (e.g., sensitive data or pseudonym thereof).

For the sake of illustration, bucket value 604 may be mapped to bucket 606A. The corresponding key 608A-1 may be obtained and provided to hash function 610 as the hash secret to produce semi-stable identifier 612. Bucket keys may be guaranteed to be stable over a certain period of time. For example, the key associated with bucket 606A may be guaranteed to be stable (e.g., unchanged) from a time window $t_1$ to $t_a$ where $t_a < t_2$. Accordingly, at any point $t_1$ and $t_a$, the semi-stable identifier for plaintext value 602 is unchanged.

In various embodiments, a key rotation may occur at some point $t_b$ where $t_a < t_b <= t_2$. The key rotation may involve the replacement or rotation of cryptographic material associated with one or more buckets. As an illustrative example, the bottom portion of FIG. 6 depicts a key rotation for bucket 606A, in which a new key 608A-2 replaces the previous key 608A-1 that was associated with bucket 606A at time $t_1$.

The bottom portion of FIG. 6 depicts the same plaintext value 602 and bucket value 604 may be used to generate the same plaintext identifier that is provided as the same input string to the same hash function 610, in relation to the upper portion of FIG. 6. Additionally, bucket value 604 also maps to bucket 606A. However, as can be seen in the bottom portion of FIG. 6, a different key 608A-2 is associated with bucket 606A at time $t_2$, and provided as the hash secret of hash function 610. Accordingly, the semi-stable identifier

614 generated for plaintext value 602 at time $t_2$ is different from the semi-stable identifier 612 generated for plaintext value 602 at time $t_1$.

In accordance with at least one embodiment, a semi-stable identifier refers to a type of identifier that may be used to pseudonymize sensitive data, such as personal data, identifiers linked to personal data, and so forth. As described above, for example, there are many different types of sensitive data, including but not limited to personally identifiable information (PII), personal health information (PHI), and so forth. A semi-stable identifier may be used to ensure the stability of a pseudonym for a set time period. Semi-stable identifiers may differ from stable identifiers in various ways. For example, a stable identifier may be implemented using a mapping table that is persisted and accessed on demand to support stable pseudonyms.

Different types of identifiers may be discussed herein, and may be implemented in accordance with at least one embodiment of the present disclosure. Stable identifiers may refer to identifiers that are stable across hash secret rotations. Stable identifiers may be implemented using a mapping table that maintains a relationship between a hash value and a stable identifier, such as a UUID. In contrast, non-stable identifiers may refer to identifiers where the pseudonym value of the underlying data is liable to change each time a hash secret changes. Semi-stable identifiers may refer to identifiers that can be shared with some systems in plaintext but are pseudonymized when they appear within other systems. For example, a semi-stable identifier may appear in a plaintext or readable format to a retail system (e.g., URL click token parameter) but appears as a pseudonymized value within advertising systems.

In various embodiments, a semi-stable identifier is implemented wherein the plaintext data identifier embeds a time component and the hashing algorithm ensures that it hashes to the same consistent value based on the time component. For example, the time component may indicate that the semi-stable identifier should be stable for 30 days. In various embodiments, a first key may be used to pseudonymize the data over a 30-day period, thereby ensuring the same pseudonymized value is generated over the 30-day period. Once the period has elapsed, a second key may be use to hash the data, thereby generating a different pseudonymized value. This technique may be used to ensure that an identifier is valid for a certain period of time and/or under certain conditions.

An example technique for generating and using semi-stable identifiers is described below. In at least one embodiment, a system defines a set of buckets to span a fixed period of time that identifiers are to be stable. This may be user-defined. For example, 30 buckets may be used for a 30 day period, but other periods, such as weekly or monthly periods may be used as well. Each bucket may be associated with a hash secret to be applied by the hash function for all identifiers that are linked to the bucket. For example, bucket B_1 may be associated with January 1, bucket B_2 may be associated with January 2, and so forth and so on. Continuing, the last bucket B_30 may be associated with January 30, and then assignments may be restarted at the first bucket so that January 31 is associated with bucket B_1.

In various embodiments, a system provides two functions related to semi-stable identifiers. A first function may be used to create a random value in plaintext and a second function may be used as a hash function to create a pseudonym of for the plaintext value. In various embodiments, the function that generates a plaintext identifier has a format that embeds the bucket # in the plaintext value, such as <random value>+<bucket #>. For example, a random value "A117BC99WXXZ" and bucket identifier "01" may be concatenated to form a plaintext value of "A117BC99WXXZ01". In some cases, the bucket identifier is a fixed length identifier that is prepended or appended to the random value. As an illustrative example, the bucket may be a two-digit number that is limited to values between 1 and 30. Continuing with the example discussed above, an identifier generated on January 1 may have a suffix of "01." When that value is pseudonymized using the second pseudonymization function, it uses the hash secret assonated with bucket B_1. In various embodiments, the system ensures that the key associated with bucket B_1 is not rotated until the end of the 30-day period. In this example, the key associated with bucket B_1 may be guaranteed to remain constant from January 1 to January 30, and may be rotated starting on January 31.

Therefore, the pseudonymization of any plaintext identifier with "01" embedded in it will be consistent for 30 days from January 1, when the plaintext identifier was created. In various embodiments, it may be assumed that the system would not expect to pseudonymize a plaintext identifier beyond the 30 day time-window, as there would be no guarantee that it would produce the same pseudonym value after the 30 day window as it does within the 30 day window.

Various implementations are contemplated within the scope of this disclosure. For example, time information (e.g., date) may provided as a second parameter with a previously generated value to a pseudonymization function. In this case, the function could guarantee stability within a time period (e.g., 30 day window) as long as the same date is provided each time the specific generated value is pseudonymized. In various embodiments, the pseudonym can be stable and the pseudonymization function can be executed within a library without requiring additional network calls, such as to a centralized mapping table, which results in lower latency to pseudonymize data and higher availability and fewer potential points of failure.

Figure 7:
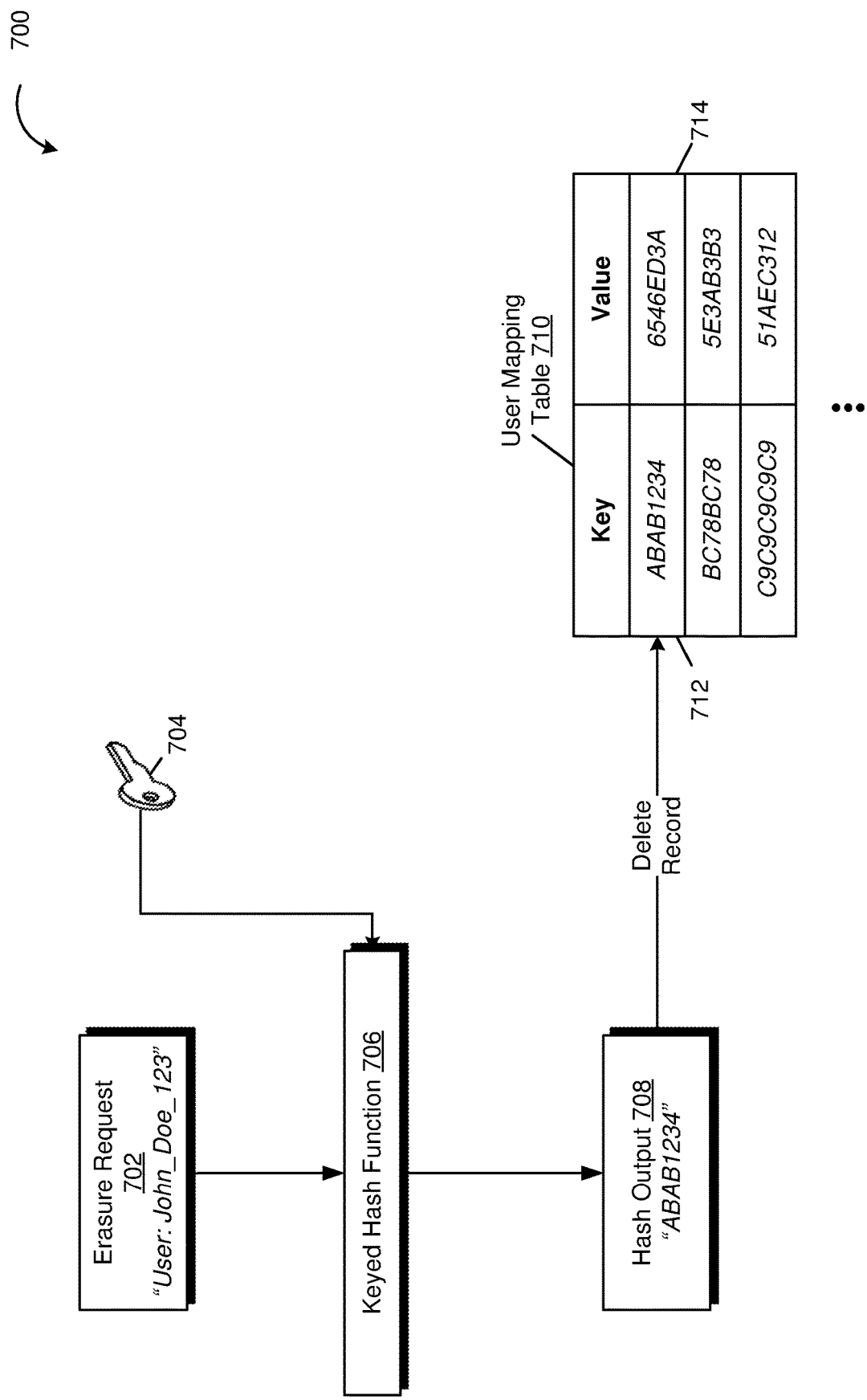
FIG. 7 illustrates a system in which an erasure request is processed, in accordance with one or more example embodiments of the present disclosure.

FIG. 7 illustrates a system 700 in which an erasure request is processed, in accordance with one or more example embodiments of the present disclosure.

In various embodiments, an erasure request 702 refers to a request (e.g., from a user) to remove certain data from a system. The data may be considered sensitive data or non-sensitive data, in various cases and circumstances. An erasure request 702 may be submitted by a user that owns or is otherwise sovereign with respect to the data that is subject to the erasure request. For example, a user "John_Doc_123" may wish for data tracking his spending habits to be erased or removed from a system so that advertisers are not able to generate directed content for him. The erasure request 702 may be received and then authenticated and/or authorized. Upon validation, a key 704 may be obtained. In some embodiments, key 704 is a current, active key. In some embodiments, key 704 is a retired key or a previous key version that was subject to a key rotation. The key may be obtained from a cryptography service and may be obtained using techniques described in connection with FIGS. 1-6 and 8, for example. Support for erasure requests may be used for compliance with GDPR data deletion requests or other privacy regulations.

In various embodiments, a keyed hash function 706 receives the user identifier "John_Doc_123" that is subject to erasure as the hash string input and key 704 as the hash secret to produce hash output 708. Hash output 708, as depicted in FIG. 7, may be seemingly random sequence of digits. For the sake of example, the hash output 708 is represented in FIG. 7 as an arbitrary string "ABAB1234."

Continuing with the example, system 700 may query the user mapping table 710. The user mapping table may be identified based on the object type of the data subject to erasure in the erasure request 702. User mapping table 710 may be queried using hash output 708. If an entry for the hash output is found in the user mapping table 710, it may be deleted. Deletion of the record from the mapping table breaks the link between the key 712 and the value 714 that is used as the stable pseudonymized identifier. Accordingly, downstream systems such as advertising systems are no longer able to associate the user "John_Doc_123" with the stable pseudonymized identifier "6546ED3A." One benefit of this system is that downstream systems do not need to be involved in the erasure request, thereby reducing the complexity of erasure requests and making it less likely that data that should be subject to erasure is inadvertently retained.

Figure 8:
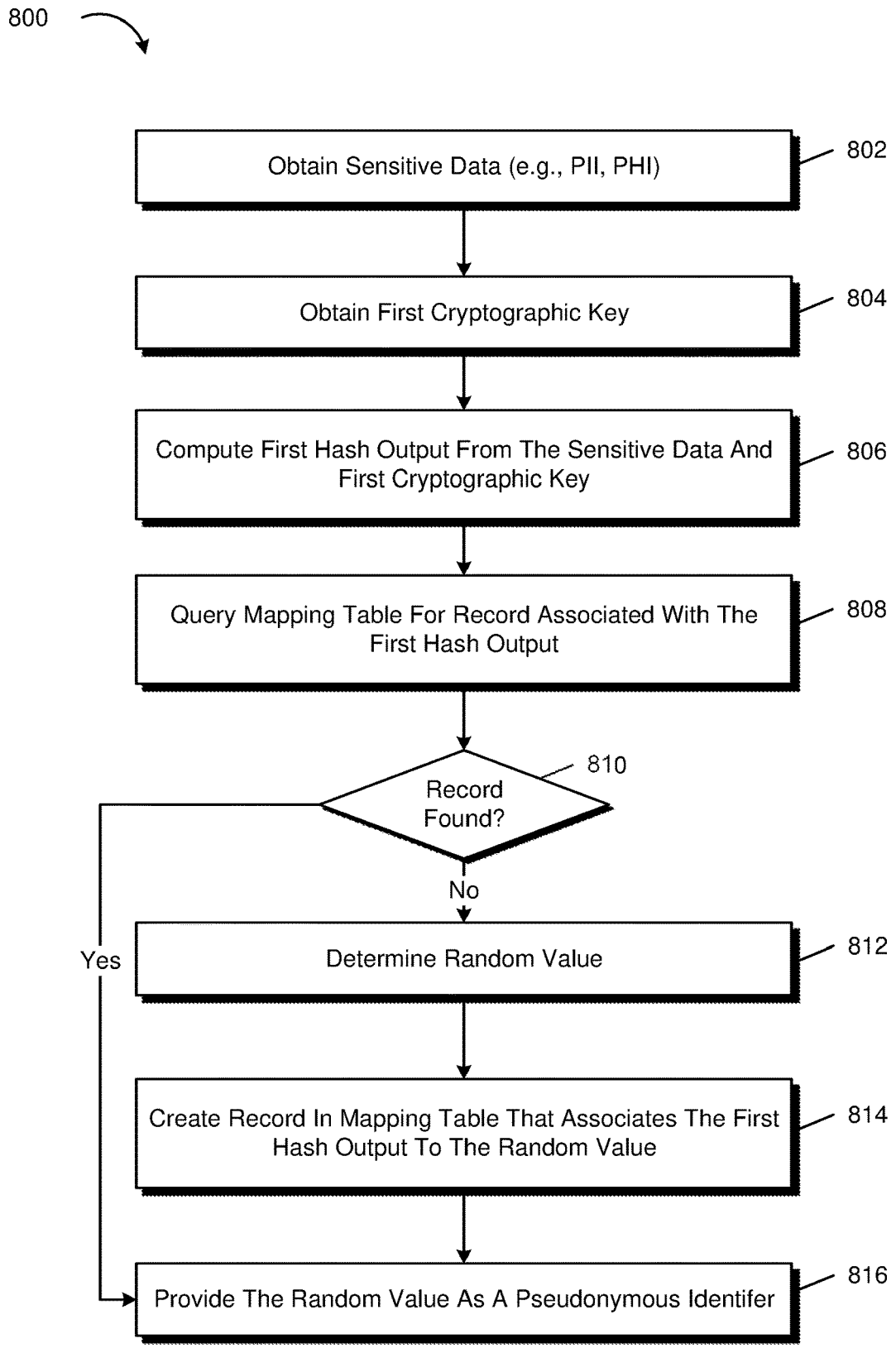
FIG. 8 shows an illustrative example of a process for creating stable pseudonymous identifiers, in accordance with one or more example embodiments of the present disclosure.

FIG. 8 shows an illustrative example of a process 800 for creating stable pseudonymous identifiers, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800 may be implemented in the context of various systems and methods described elsewhere in this disclosure, such as those discussed in connection with FIGS. 1-7 and 9-10. In at least one embodiment, process 800 or a portion thereof is implemented by a computing resource service provider.

In at least one embodiment, process 800 comprises step 802 to obtain sensitive data (e.g., PII, PHI), according to at least one embodiment. While sensitive data may include, but is not limited to: Personally Identifiable Information (PII); Personal Information (PI); Sensitive Personal Information (SPI); Nonpublic Personal Information (NPI); Material Nonpublic Information (MNPI); Private Information; Protected Health Information (PHI); regulated, business, or confidential data; or others. Furthermore, certain types of data may be subject to government regulations or rules, such as the European Union's General Data Protection Regulation (GDPR). There may be a need to be pseudonymize sensitive data to de-identify the data from a specific user for a variety of reasons. While sensitive data is depicted in FIG. 8 and described throughout this disclosure, any data may be selected or identified to be pseudonymized and for any reason.

In at least one embodiment, process 800 comprises step 804 to obtain a first cryptographic key, according to at least one embodiment. The first cryptographic key may be associated with a key identifier. The key identifier may be used to identify an active key that may be used to generate pseudonymous identifiers. In various embodiments, a cryptography service is queried using the key identifier to obtain first cryptographic key, which may be a version of a key that is active (e.g., not rotated) and can be used for generating pseudonymous identifiers, such as stable and unstable identifiers.

In at least one embodiment, process 800 comprises step 806 to compute a first hash output from the sensitive data and the first cryptographic key, according to at least one embodiment. The sensitive data—or a quantity derived thereof—may be a hash input string or a portion thereof. The hash secret may be the first cryptographic key. The hash function may be a keyed hash function or keyed one-way function, such as a HMAC function. The result of the hash function may be referred to as the hash output.

In at least one embodiment, process 800 comprises step 808 to query a mapping table for a record associated with the first hash output, according to at least one embodiment. In some embodiments, the system performing process 800 may have access to a plurality of mapping tables. Each mapping table may be associated with an object type. In at least one embodiment, the first data is associated with a first object type and the system performing process 800 identifies the mapping table from a plurality of mapping tables. The mapping table may be selected because it is associated with the first object type whereas a second mapping table of the plurality of mapping tables is associated with a second object type different from the first object type.

In at least one embodiment, process 800 comprises step 810 to determine whether the record was found in the mapping table, according to at least one embodiment. In various embodiments, the hash output is used to query the mapping table. The mapping table may be a key-value store wherein the hash output is used to query whether the mapping table has a key-value pair wherein the key of the key-value pair is the hash output.

If the record is not found in the mapping table, the system may proceed from step 810 to step 812. If the system was able to find a record associated with the first hash output, then the record may be retrieved and process 800 proceeds to step 816.

In at least one embodiment, process 800 comprises step 812 to determine a random value, according to at least one embodiment. In at least one embodiment, the system performing process 800 generates a random value. The random value may, for example, be a universally unique identifier (UUID) or globally unique identifier (GUID).

In at least one embodiment, process 800 comprises step 814 to create the record in the mapping table, according to at least one embodiment. The record may associate the first hash output with the random value. For example, if the mapping table is a key-value store, then the record may be a key-value pair wherein the key of the key-value pair is the first hash output and the value of the key-value pair is the random value.

In at least one embodiment, process 800 comprises step 816 to provide the random value as a pseudonymous identifier, according to at least one embodiment. In various embodiment, the random value is provided as the pseudonymous identifier to a downstream system, such as advertising systems. The pseudonymous identifier may be stable and retain the same value after a key rotation is performed on the first cryptographic key. In various embodiments, the downstream systems are not able to ascertain whether the pseudonymous identifier that it receives is stable or non-stable.

Figure 9:
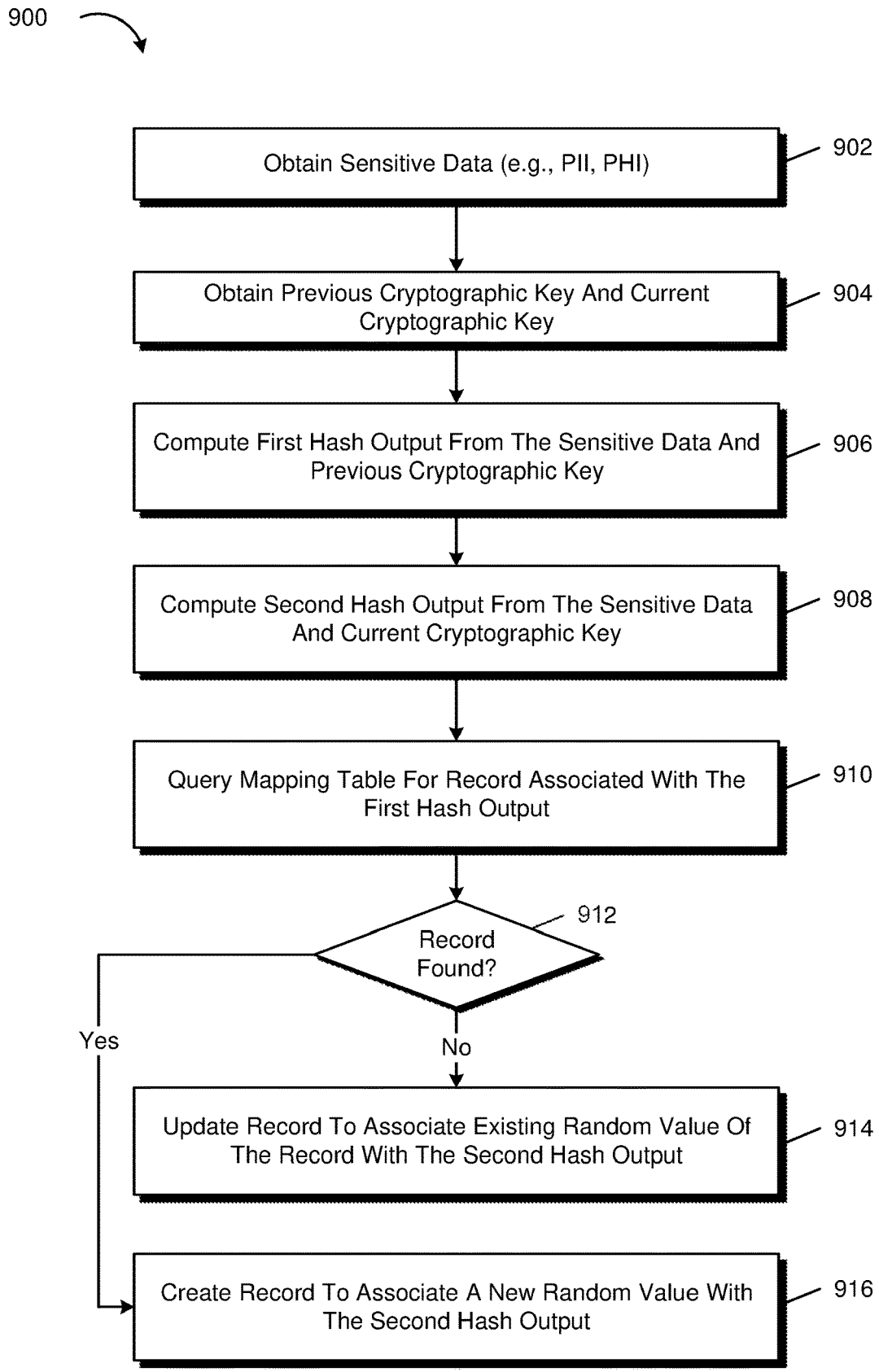
FIG. 9 shows an illustrative example of a process related to stable pseudonymous identifiers, in accordance with one or more example embodiments of the present disclosure.

FIG. 9 shows an illustrative example of a process 900 related to stable pseudonymous identifiers, in accordance with one or more example embodiments of the present disclosure. In at least one embodiment, some or all of the process 900 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 900 may be implemented in the context of various systems and methods described elsewhere in this disclosure, such as those discussed in connection with FIGS. 1-8 and 10. In at least one embodiment, process 900 or a portion thereof is implemented by a computing resource service provider.

In at least one embodiment, process 900 comprises step 902 to obtain sensitive data (e.g., PII, PHI), according to at least one embodiment. While sensitive data may include, but is not limited to: Personally Identifiable Information (PII); Personal Information (PI); Sensitive Personal Information (SPI); Nonpublic Personal Information (NPI); Material Nonpublic Information (MNPI); Private Information; Protected Health Information (PHI); regulated, business, or confidential data; or others. Furthermore, certain types of data may be subject to government regulations or rules, such as the European Union's General Data Protection Regulation (GDPR). There may be a need to pseudonymize sensitive data to de-identify the data from a specific user for a variety of reasons. While sensitive data is depicted in FIG. 9 and described throughout this disclosure, any data may be selected or identified to be pseudonymized and for any reason.

Process 900 may be implemented in the context of an environment that exists after a process in accordance with FIG. 8 is performed. For example, a stable pseudonymous identifier for the sensitive data described in step 902 may have been previously created using a first key, which is then subject to a key rotation prior to the performance of process 900.

In at least one embodiment, process 900 comprises step 904 to obtain previous cryptographic key and current cryptographic key, according to at least one embodiment. In at least one embodiment, previous cryptographic key and current cryptographic key are obtained from a cryptography service. In at least one embodiment, previous cryptographic key and current cryptographic key are both associated to the same key identifier. In at least one embodiment, a key rotation was performed such that the current cryptographic key is able to be used to generate new cryptographic material (e.g., new HMACs) and the previous cryptographic key is a previous version of the key that should not be used to generate new cryptographic material, but may be used to validate existing cryptographic material. For example, keys that have been subject to key rotation may be suitably used to perform decryption operations on existing ciphertexts, but may be unsuitable for creating new ciphertexts. In at least one embodiment, previous cryptographic key has been previously used to create a record in a mapping table that links the sensitive data to a stable identifier, for example, by using techniques described in connection with FIG. 8.

In at least one embodiment, process 900 comprises step 906 to compute a first hash output from the sensitive data and the previous cryptographic key, according to at least one embodiment. A keyed hash function such as an HMAC function may be used to generate the first hash output.

In at least one embodiment, process 900 comprises step 908 to stuff, according to at least one embodiment. A keyed hash function such as an HMAC function may be used to generate the second hash output.

In at least one embodiment, process 900 comprises step 910 to query a mapping table for a record associated with the first hash output, according to at least one embodiment. The mapping table may be a key-value store wherein the first hash output is used to query whether the mapping table has a key-value pair wherein the key of the key-value pair is the first hash output.

In at least one embodiment, process 900 comprises step 912 to determine whether a record was found, according to at least one embodiment. If a record was found, then process 900 may proceed to step 914. Conversely, if a record was not found, then the process 900 may proceed to step 916.

In at least one embodiment, process 900 comprises step 914 to update the record to associate the existing random value of the record with the second hash output, according to at least one embodiment. This step may be performed in response to the retrieval of a record in the mapping table that links the first hash output to an existing random value, which is used as a stable identifier. In this way, the same existing random value is now linked to the second hash output generated by the current cryptographic key, thereby linking the sensitive data via the current cryptographic key to the same random value that was previously associated to the same sensitive data via the previous cryptographic key.

In at least one embodiment, process 900 comprises step 916 to create a record to associate a new random value with the second hash output, according to at least one embodiment. This step may be performed in response to a determination that there are no existing records in the mapping table that link the sensitive data via the first hash output to any stable identifiers. The record may be created using techniques described in connection with FIGS. 1-8. For example, a universally unique identifier (UUID) may be generated and a key-value pair comprising the second hash output as the key and the UUID as the value may be persisted to the mapping table.

One or more operations of the methods, process flows, or use cases of FIGS. 1-10 may have been described above as being performed by a user device, or more specifically, by one or more program module(s), applications, or the like executing on a device. It should be appreciated, however, that any of the operations of the methods, process flows, or use cases of FIGS. 1-10 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-10 may be described in the context of the illustrative devices, it should be appreciated that such operations may be implemented in connection with numerous other device configurations.

The operations described and depicted in the illustrative methods, process flows, and use cases of FIGS. 1-10 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 10:
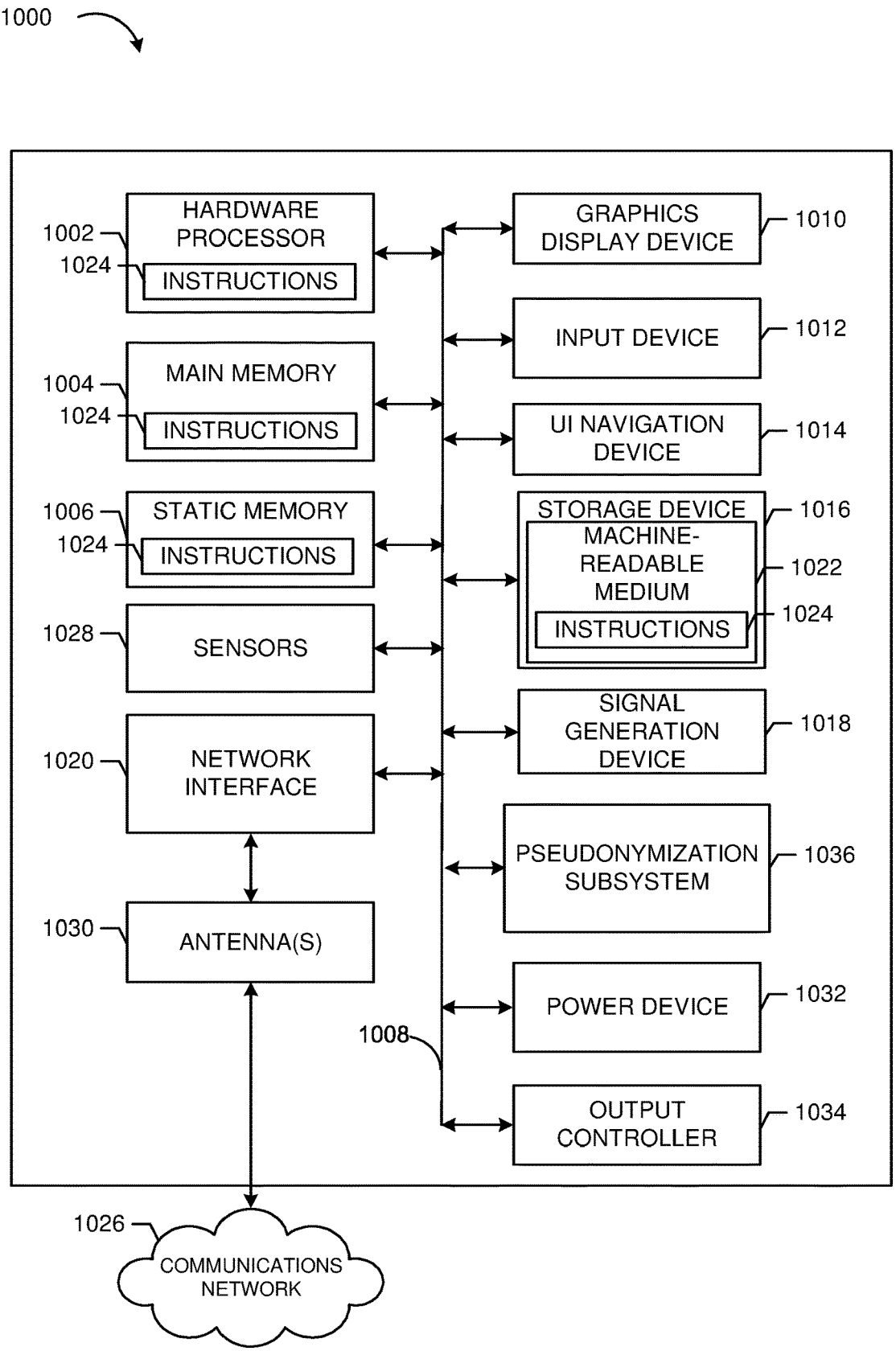
FIG. 10 illustrates a block diagram of an example machine upon which any of one or more techniques (e.g., methods) may be performed, in accordance with one or more example embodiments of the present disclosure.

FIG. 10 illustrates a block diagram of an example of a machine 1000 (e.g., implemented in whole or in part in the context of embodiments described in connection with other figures. In some embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in Wi-Fi direct, peer-to-peer (P2P) (or other distributed) network environments. The machine 1000 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include any combination of the illustrated components. For example, the machine 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (e.g., drive unit) 1016, a signal generation device 1018, and a network interface device/transceiver 1020 coupled to antenna(s) 1030. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

Pseudonymization subsystem 1036 may refer to software, hardware, or a combination thereof that is capable of performing techniques described in connection with FIGS. 1-9. For example, pseudonymization subsystem 1036 may be used to implement some or all of the processes described in connection with FIGS. 7 and 8. In some embodiments, systems such as those described in connection with FIGS. 1-6 is implemented at least in part by pseudonymization subsystem 1036. In various embodiments, pseudonymization subsystem 1036 receives sensitive data and generates stable pseudonymous identifiers, semi-stable pseudonymous identifiers, and/or unstable pseudonymous identifiers.

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different $x_1$ and $x_2$ is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station." "handheld device." "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating." when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second." "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBec, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software components without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machines, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
   receiving, at a data boundary and by one or more processors of a computer system, sensitive data that is associated with an object type;
   determining, by the one or more processors of the computer system, based on the object type, a manner in which the sensitive data is to be pseudonymized;
   storing, in volatile memory of the computer system, the sensitive data;
   obtaining, by the one or more processors of the computer system, a first cryptographic key from a cryptography service;
   providing, by the one or more processors of the computer system, the sensitive data and the first cryptographic key to a keyed hash function as inputs;
   obtaining, by the one or more processors of the computer system and from the keyed hash function, a first hash output;
   based at least in part on successfully obtaining the first hash output, discarding the sensitive data from the volatile memory of the computer system;
   determining, by the one or more processors of the computer system, a mapping table associated with the object type;
   querying, by the one or more processors of the computer system, the mapping table to determine whether the mapping table includes a record associated with the sensitive data;
   determining, by the one or more processors of the computer system, a response to the querying that indicates the record associated with the sensitive data does not exist in the mapping table;
   determining, by the one or more processors of the computer system, a random value;
   determining, by the one or more processors of the computer system, a first key-value pair for the sensitive data, wherein the first key-value pair comprises the first hash output and the random value;
   persisting, by the one or more processors of the computer system, the first key-value pair in the mapping table; and providing, to a second computer system, the random value as a stable pseudonymous identifier of the sensitive data.

2. The computer-implemented method of claim 1, further comprising:
performing a key rotation of the first cryptographic key;
obtaining the sensitive data in a second message;
obtaining the first cryptographic key and second cryptographic key from the cryptography service;
providing the sensitive data and the first cryptographic key to the keyed hash function as inputs;
obtaining, from the keyed hash function, the first hash output;
providing the sensitive data and the second cryptographic key to the keyed hash function as inputs;
obtaining, from the keyed hash function, a second hash output;
querying, using the first hash output, the mapping table to obtain the first key-value pair;
determining a second key-value pair, the second key-value pair comprising:
the second hash output; and
the random value of the first key-value pair;
replacing, in the mapping table, the first key-value pair with the second key-value pair; and
providing the random value as the stable pseudonymous identifier of the sensitive data.

3. The computer-implemented method of claim 2, further comprising:
obtaining the sensitive data in a third message;
obtaining the second cryptographic key from the cryptography service;
providing the sensitive data and the second cryptographic key to the keyed hash function as inputs;
obtaining, from the keyed hash function, the second hash output;
querying, using the second hash output, the mapping table to obtain the second key-value pair; and
providing the random value of the second key-value pair as the stable pseudonymous identifier of the sensitive data.

4. The computer-implemented method of claim 1, wherein the keyed hash function is a HMAC (hash-based message authentication code) function.

5. A system, comprising:
one or more processors; and
memory storing executable instructions that, as a result of execution by the one or more processors, cause the system to:
obtain first data;
obtain a first cryptographic key from a cryptography service;
determine, based at least in part on the first data and the first cryptographic key, a first hash output of a hash function;
determine that a mapping table does not include a first record associated with the first hash output;
create, in the mapping table, the first record, wherein the first record comprises:
the first hash output; and
a random value; and
provide, to a second system, the random value as a stable pseudonymous identifier of the first data.

6. The system of claim 5, wherein the executable instructions include further instructions that, as a result of execution by the one or more processors, further cause the system to:

obtain the first data in a second message;
obtain the first cryptographic key and a second cryptographic key from the cryptography service;
determine, based at least in part on the first data and the first cryptographic key, the first hash output of the hash function;
determine, based at least in part on the first data and the second cryptographic key, a second hash output of the hash function;
query, using the first hash output, the mapping table to obtain the first record;
determine a second record, the second record comprising:
the second hash output; and
the random value of the first record;
update the mapping table with the second record; and
provide the random value as the stable pseudonymous identifier of the first data.

7. The system of claim 6, wherein the executable instructions include further instructions that, as a result of execution by the one or more processors, further cause the system to:
obtain the first data in a third message;
obtain the second cryptographic key from the cryptography service;
determine, based at least in part on the first data and the second cryptographic key, the second hash output of the hash function;
query, using the second hash output, the mapping table to obtain the second record; and
provide the random value of the second record as the stable pseudonymous identifier of the first data.

8. The system of claim 5, wherein the random value is a universally unique identifier (UUID).

9. The system of claim 5, wherein:
the first data is associated with a first object type; and
the system is configured to further identify the mapping table from a plurality of mapping tables, wherein the mapping table is associated with the first object type and a second mapping table of the plurality of mapping tables is associated with a second object type different from the first object type.

10. The system of claim 5, wherein the first data includes Personally Identifiable Information (PII) or Protected Health Information (PHI).

11. The system of claim 5, wherein the first data is stored in volatile memory of the system.

12. The system of claim 11, wherein the executable instructions include further instructions that, as a result of execution by the one or more processors, further cause the system to:
in response to the determination of the first hash output, discard the first data from the volatile memory of the system.

13. A non-transitory computer-readable storage medium storing executable instructions that, as a result of being executed by one or more processors of a computer system, cause the computer system to at least:
obtain first data;
obtain a first cryptographic key from a cryptography service;
determine, based at least in part on the first data and the first cryptographic key, a first hash output of a hash function;
determine that a mapping table does not include a first record associated with the first hash output;
create, in the mapping table, the first record, wherein the first record comprises:

the first hash output; and
a random value; and
provide, to a second computer system, the random value as a stable pseudonymous identifier of the first data.

14. The non-transitory computer-readable storage medium of claim 13, wherein the executable instructions include further instructions that, as a result of execution by the one or more processors, further cause the computer system to:
obtain the first data in a second message;
obtain the first cryptographic key and a second cryptographic key from the cryptography service;
determine, based at least in part on the first data and the first cryptographic key, the first hash output of the hash function;
determine, based at least in part on the first data and the second cryptographic key, a second hash output of the hash function;
query, using the first hash output, the mapping table to obtain the first record;
determine a second record, the second record comprising:
the second hash output; and
the random value of the first record;
update the mapping table with the second record; and
provide the random value as the stable pseudonymous identifier of the first data.

15. The non-transitory computer-readable storage medium of claim 14, wherein the executable instructions include further instructions that, as a result of execution by the one or more processors, further cause the computer system to:
obtain the first data in a third message;
obtain the second cryptographic key from the cryptography service;
determine, based at least in part on the first data and the second cryptographic key, the second hash output of the hash function;
query, using the second hash output, the mapping table to obtain the second record; and
provide the random value of the second record as the stable pseudonymous identifier of the first data.

16. The non-transitory computer-readable storage medium of claim 13, wherein the random value is a universally unique identifier (UUID).

17. The non-transitory computer-readable storage medium of claim 13, wherein:
the first data is associated with a first object type; and
the executable instructions are configured to further cause the computer system to identify the mapping table from a plurality of mapping tables, wherein the mapping table is associated with the first object type and a second mapping table of the plurality of mapping tables is associated with a second object type different from the first object type.

18. The non-transitory computer-readable storage medium of claim 13, wherein the first data includes Personally Identifiable Information (PII) or Protected Health Information (PHI).

19. The non-transitory computer-readable storage medium of claim 13, wherein the first data is stored in volatile memory of the system.

20. The non-transitory computer-readable storage medium of claim 19, wherein the executable instructions include further instructions that, as a result of execution by the one or more processors, further cause the computer system to:
in response to the determination of the first hash output, discard the first data from the volatile memory of the system.

* * * * *